US007899584B2

(12) United States Patent
Schricker

(10) Patent No.: US 7,899,584 B2
(45) Date of Patent: Mar. 1, 2011

(54) METHOD OF CONTROLLING A VEHICLE BASED ON OPERATION CHARACTERISTICS

(75) Inventor: David R. Schricker, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 1037 days.

(21) Appl. No.: 11/711,790

(22) Filed: Feb. 28, 2007

(65) Prior Publication Data

US 2008/0208393 A1 Aug. 28, 2008

(51) Int. Cl.
*G06F 7/70* (2006.01)

(52) U.S. Cl. .................................. 701/1; 701/65; 701/50

(58) Field of Classification Search .................... 701/50, 701/65, 55, 56
See application file for complete search history.

(56) References Cited

U.S. PATENT DOCUMENTS 2,210,130 A 8/1940 Rose at al.
3,893,347 A 7/1975 Fracchioni et al.
3,894,603 A 7/1975 Winzeler
4,089,238 A 5/1978 Förster et al.
4,163,914 A 8/1979 Keyes
4,170,152 A 10/1979 Windish et al.
4,233,857 A 11/1980 Quick
4,414,863 A 11/1983 Heino
4,625,590 A 12/1986 Müller
4,732,055 A 3/1988 Tateno et al.
5,116,292 A 5/1992 Han
5,393,277 A 2/1995 White et al.
5,459,658 A 10/1995 Morey et al.
5,510,982 A 4/1996 Ohnishi et al.
5,845,224 A 12/1998 McKee
5,995,895 A * 11/1999 Watt et al. ........................ 701/50
6,070,118 A * 5/2000 Ohta et al. ....................... 701/65
6,085,137 A * 7/2000 Aruga et al. ..................... 701/51
6,098,005 A * 8/2000 Tsukamoto et al. ............ 701/65
6,182,000 B1 * 1/2001 Ohta et al. ....................... 701/55
6,199,001 B1 * 3/2001 Ohta et al. ....................... 701/51
6,220,986 B1 * 4/2001 Aruga et al. ..................... 477/97
6,278,928 B1 * 8/2001 Aruga et al. ..................... 701/65
6,496,767 B1 12/2002 Lorentz
6,553,301 B1 * 4/2003 Chhaya et al. .................. 701/54
6,625,535 B2 * 9/2003 Han et al. ......................... 701/65
6,856,866 B2 * 2/2005 Nakao ............................. 701/22

(Continued)

FOREIGN PATENT DOCUMENTS

GB 1 397 686 6/1975

(Continued)

OTHER PUBLICATIONS

U.S. Appl. No. 11/239,227, filed Sep. 30, 2005, entitled "Service for Improving Haulage Efficiency".

*Primary Examiner* — Khoi Tran
*Assistant Examiner* — Brian J Broadhead
(74) *Attorney, Agent, or Firm* — Finnegan, Henderson, Farabow, Garrett & Dunner

(57) ABSTRACT

A method of controlling a vehicle includes determining an operation assigned to the vehicle along at least one segment of a route assigned to the vehicle and determining at least one control parameter of the vehicle based on at least one operation characteristic. The at least one operation characteristic relates to the operation assigned to the vehicle. The at least one control parameter is determined before operating the vehicle on the assigned route.

21 Claims, 8 Drawing Sheets

U.S. PATENT DOCUMENTS

| | | | | |
|---|---|---|---|---|
| 6,856,897 | B1 * | 2/2005 | Phuyal et al. | 701/208 |
| 7,076,355 | B2 * | 7/2006 | Ota et al. | 701/51 |
| 7,162,353 | B2 * | 1/2007 | Minowa et al. | 701/96 |
| 7,445,079 | B2 * | 11/2008 | Biallas | 180/338 |
| 7,480,552 | B2 * | 1/2009 | Bates et al. | 701/51 |
| 2002/0042672 | A1 * | 4/2002 | Shiiba et al. | 701/65 |
| 2002/0143454 | A1 * | 10/2002 | Bates et al. | 701/51 |
| 2003/0033069 | A1 * | 2/2003 | Bauer et al. | 701/65 |
| 2003/0130779 | A1 * | 7/2003 | Shiimado et al. | 701/65 |
| 2007/0078579 | A1 * | 4/2007 | Schricker et al. | 701/50 |
| 2008/0201047 | A1 * | 8/2008 | Eisele et al. | 701/65 |

FOREIGN PATENT DOCUMENTS

| | | |
|---|---|---|
| GB | 2 288 217 A | 10/1995 |

* cited by examiner

METHOD OF CONTROLLING A VEHICLE BASED ON OPERATION CHARACTERISTICS

TECHNICAL FIELD

The present disclosure relates generally to a method of controlling a vehicle, and more particularly, to a method of controlling a vehicle based on operation characteristics.

BACKGROUND

Mining and large scale excavating operations may require fleets of haulage vehicles to transport excavated material, such as ore or overburden, from an area of excavation to a destination. For such an operation to be productive and profitable, the fleet of haulage vehicles must be efficiently operated. Efficient operation of a fleet of haulage vehicles is affected by numerous operation characteristics. For example, the grade and character of haul routes and the amount of payload have direct effects on haulage cycle time, equipment component wear, and fuel consumption which, in turn, directly affect productivity and profitability of the operation.

In order to reduce inefficiencies in the operation of the haulage vehicles, the vehicles may be provided with technology for monitoring various operation characteristics. Data from monitoring equipment may be collected, processed, and compared to a standard in order to determine any corrective measures that may be desired or required.

One method of controlling an automobile based on one or more sensed operating characteristics is described in U.S. Pat. No. 5,510,982 (the '982 patent) issued to Ohnishi et al. The '982 patent describes a method for automatically selecting a predetermined shift gear based on a stored preset shift pattern. The shift gear may be selected based on a sensed vehicle speed, a sensed throttle valve opening, an estimated vehicle weight, and an estimated running load.

The system of the '982 patent provides a system for auto-shifting a transmission of an automobile based on operation characteristics that are sensed in real time. Such a system may shift into a lower gear over relatively steeper portions of the terrain and then shift into a higher gear over relatively flatter portions of the terrain. However, since the system operates based on characteristics that are sensed in real time while the automobile is traveling along its route, the system may tend to "gear hunt" in situations such as when traveling over bumpy terrain. In such situations, the system may repeatedly shift between first and second gears without providing any significant advantages with respect to speed or fuel consumption. Each shift may result in a loss of energy, and the transmission may operate less efficiently when shifting than when operating in gear. This may result in slower cycle times, greater fuel use, and a less efficient operation of the automobile.

The disclosed method is directed to overcoming one or more of the problems set forth above.

SUMMARY OF THE INVENTION

In one aspect, the present disclosure is directed to a method of controlling a vehicle. The method includes determining an operation assigned to the vehicle along at least one segment of a route assigned to the vehicle and determining at least one control parameter of the vehicle based on at least one operation characteristic. The at least one operation characteristic relates to the operation assigned to the vehicle. The at least one control parameter is determined before operating the vehicle on the assigned route.

In another aspect, the present disclosure is directed to a system for controlling a vehicle. The system includes a controller and memory coupled to the controller. The controller is configured to determine an operation assigned to the vehicle along at least one segment of a route assigned to the vehicle and determine at least one control parameter of the vehicle based on at least one operation characteristic before the vehicle operates on the assigned route. The at least one operation characteristic relates to the operation assigned to the vehicle.

In a further aspect, the present disclosure is directed to a method of controlling a vehicle. The method includes determining at least one control parameter of the vehicle associated with each of a plurality of payload amounts. The at least one control parameter is associated with an operation of the vehicle along at least one segment of a route of the vehicle. The method also includes measuring a payload amount and determining a target control parameter based on the determined control parameters and the measured payload amount.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts.

Figure 1:
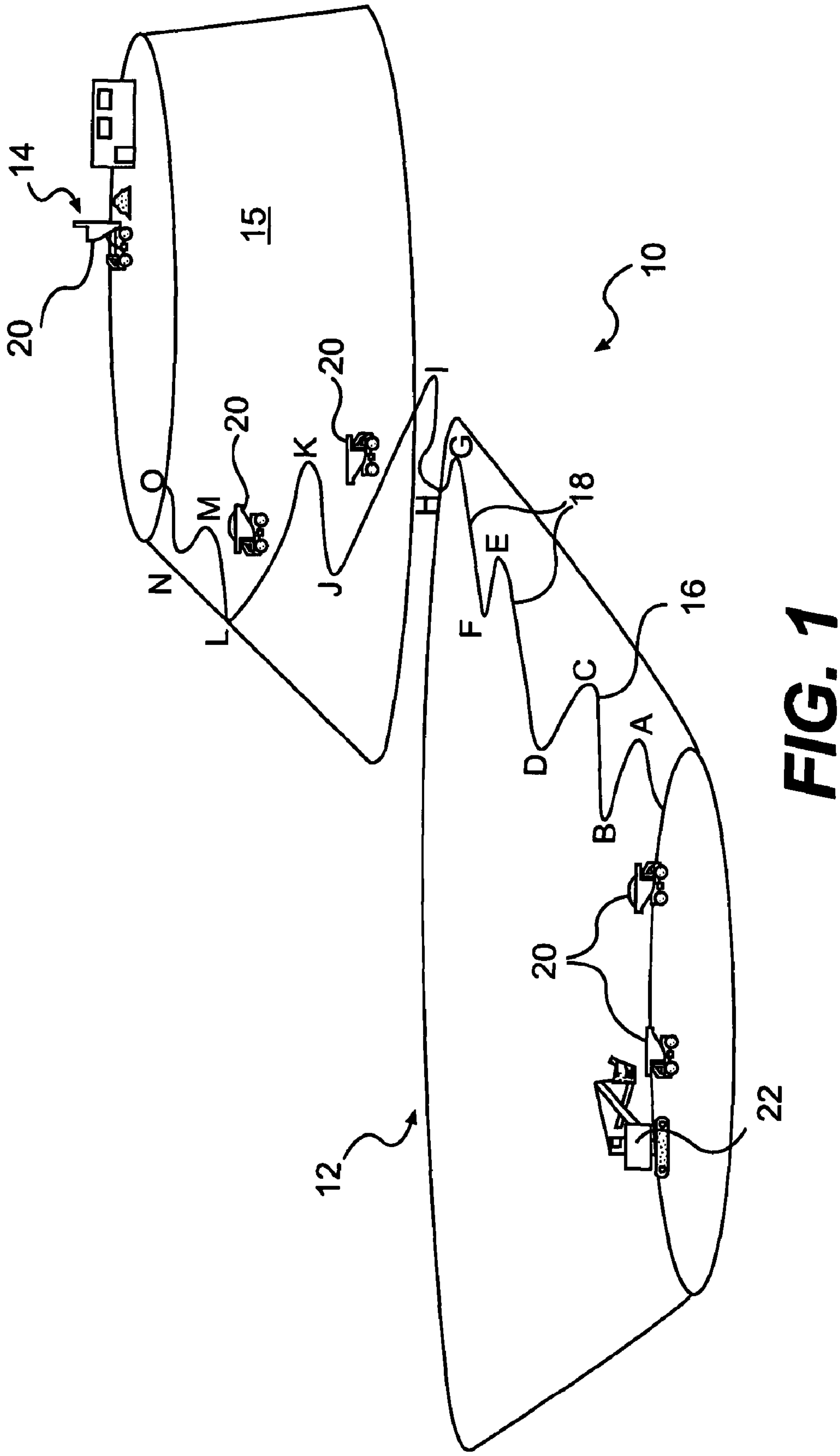
FIG. 1 is a schematic and diagrammatic representation of an exemplary mine layout.

FIG. 1 schematically and diagrammatically illustrates an open pit mine operation 10 including an open pit mine 12 and a processing region 14 which may be, but is not required to be, on top of a dumping mound 15. The open pit mine 12 is connected to the processing region 14 by at least one haul route 16, which includes haul route segments 18 between designated letters A, B, C, etc. A fleet of haulage vehicles 20 may travel from the area of excavation of the open pit mine 12 along the haul route 16 to the processing region 14. In the open pit mine 12, another machine 22 may operate to excavate material, which may be ore or overburden and which may be loaded into the haulage vehicles 20. The haulage vehicles 20 may carry a payload, e.g., the excavated material, when traveling from the open pit mine 12 to the processing region 14. Thus, in an exemplary haulage cycle, a payload may be loaded onto the haulage vehicle 20, the haulage vehicle 20 may travel along its assigned haul route 16 from the mine 12 to the processing region 14, where the payload may be unloaded from the haulage vehicle 20, and then the haulage vehicle 20 may travel along its assigned haul route 16 back to the mine 12 from the processing region 14. Each haulage vehicle 20 may be assigned to a specific haul route 16 for a particular day, week, or other period of time, or until a particular haulage operation is completed.

The haulage vehicle 20 may be a large, off-road vehicle. It should be noted that the disclosed embodiment may be applicable to other types of haulage vehicles such as, for example, on-highway trucks or other earth moving machinery capable of carrying a payload. The disclosed embodiment may also be applicable to a mobile machine that performs some type of operation associated with an industry such as mining, construction, farming, transportation, or any other industry known in the art. For example, the machine may be a commercial machine, such as a truck, crane, earth moving machine, mining vehicle, material handling equipment, farming equipment, marine vessel, aircraft, an excavator, a dozer, a loader, a backhoe, a motor grader, a dump truck, or any type of machine that operates in a work environment such as a construction site, mine site, power plant, etc.

The point of excavation within the mine 12 and the processing region 14 may be at different elevations. As a result, the haulage vehicles 20 may transport excavated material along the haul route 16 at least in part from a lower elevation to a higher elevation. The haul route 16 may be designed with such a grade as to permit the haulage vehicles 20 to negotiate the portion of a haulage cycle from the excavation area within the mine 12 to the processing region 14 while carrying a payload at or near the maximum rated payload for the haulage vehicle 20. Alternatively, the haul route 16 may vary significantly from the ideal, and the weight of one payload may likewise vary substantially from the weight of another payload.

Figure 4:
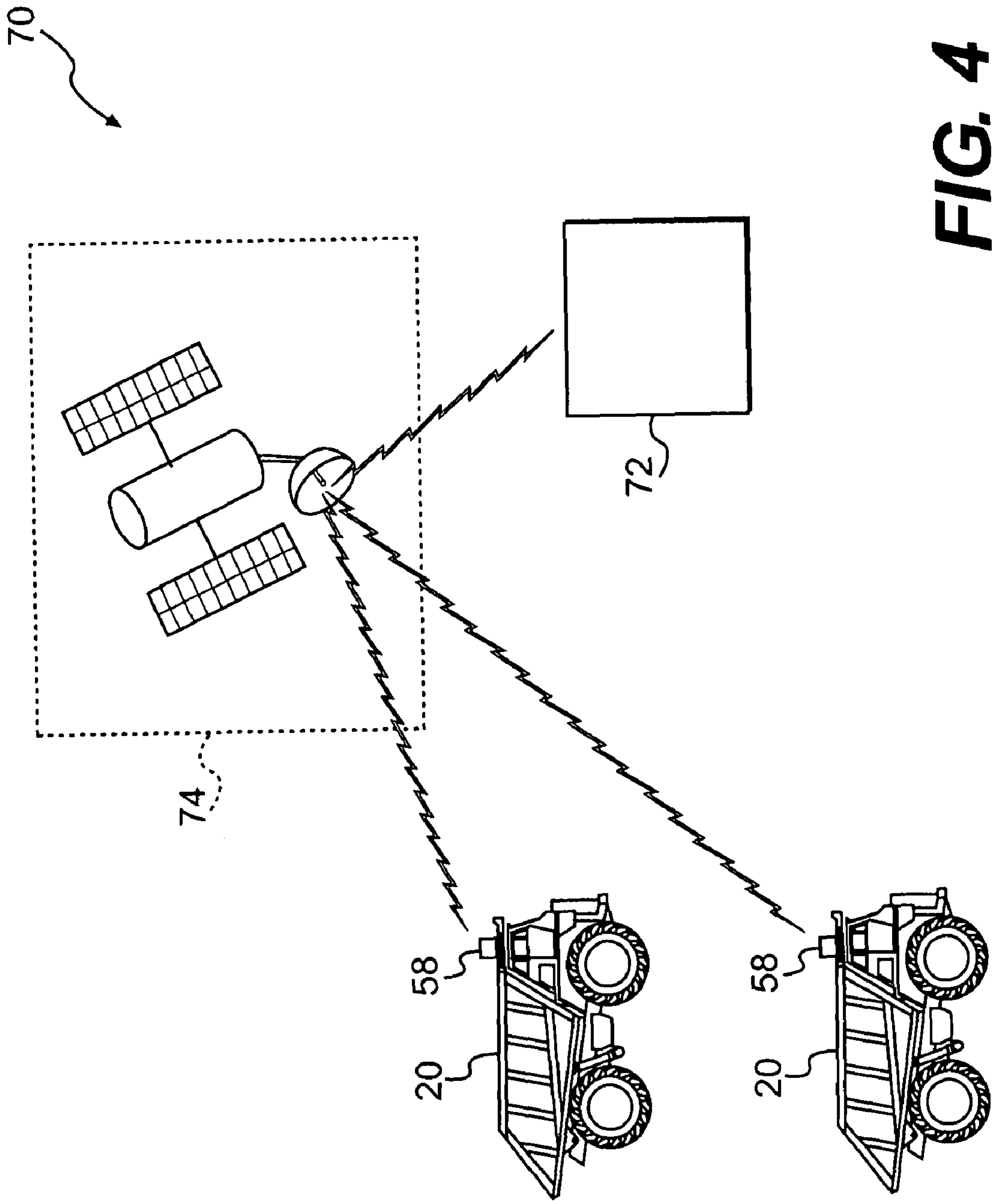
FIG. 4 is a schematic and diagrammatic illustration of an exemplary haulage vehicle monitoring system.

The haulage vehicle 20 may include a load measuring system (not shown) that can measure a weight of the payload loaded onto the haulage vehicle 20. Alternatively, a load measuring system may be provided on the machine 22 that loads the payload onto the haulage vehicle 20, and the machine 22 may communicate the measured payload amount to the haulage vehicle 20 and/or an off-board central computer system 72 (FIG. 4).

Figure 2:
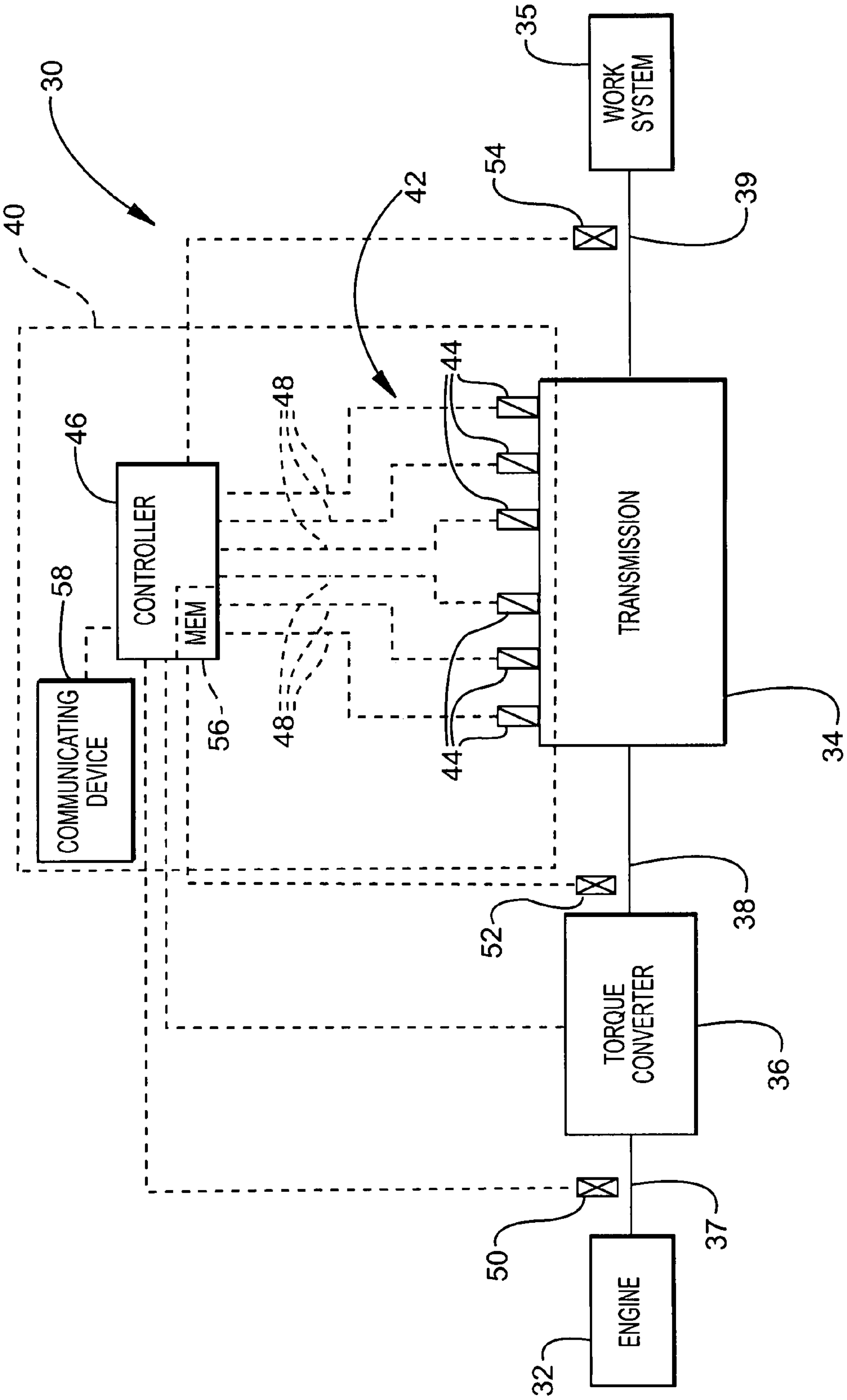
FIG. 2 is a schematic and diagrammatic illustration of an exemplary drive train of a haulage vehicle.

FIG. 2 illustrates an exemplary drive train 30 that may be included in the haulage vehicle 20. The drive train 30 includes an internal combustion engine 32, a multi-speed transmission 34, and a work system 35. While this exemplary embodiment utilizes an internal combustion engine, the present invention is not necessarily so limited. The work system 35 of the exemplary embodiment may include wheels and may also include differentials, axles, tracks, or other mechanisms used to propel the haulage vehicle 20. Additionally, a fluidic torque converter 36 may also be provided between the engine 32 and the transmission 34. In particular, the input shaft 38 of the transmission 34 is driven by the engine 32 via an engine drive shaft 37 and the torque converter 36. The input shaft 38 drives the transmission 34, which in turn drives a transmission output shaft 39. The transmission output shaft 39 in turn drives the work system 35, which propels the haulage vehicle 20.

The transmission 34 may be a six-speed automatic transmission and may include a gear assembly and one or more clutch assemblies configured to provide a plurality of forward and/or reverse gear ratios that correlate to a ratio of the input speed of the transmission 34 to the output speed of the transmission 34. For example, the transmission 34 may include one or more planetary gear trains and one or more clutches configured to selectively engage such that the transmission 34 provides a plurality of forward and/or reverse gear ratios. Other types of transmissions known to those skilled in the art may be used, such as a high-low range transmission (e.g., a transmission having one or two transfer gears for selecting a high or low speed range), a split torque or dual path hybrid transmission (e.g., a transmission having a mechanical power flow path and a parallel hydraulic or electric motor power flow path), etc.

The exemplary transmission 34 includes a number of gear ratios which can be selectively engaged or disengaged from the transmission output shaft 39 during operation of the drive train 30. In particular, during an upshift from a first gear ratio to a second gear ratio, the first gear ratio is disengaged from the transmission output shaft 39 and the second gear ratio is engaged to the transmission output shaft 39. Similarly, during a downshift from the second gear ratio to the first gear ratio, the second gear ratio is disengaged from the transmission output shaft 39 and the first gear ratio is engaged to the transmission output shaft 39. It should be appreciated that the terms "first gear ratio," "second gear ratio," and "third gear ratio" apply to any adjacent gear ratios between which an upshift or downshift may be initiated and does not imply the lowest three gear ratios of the transmission 34. In an exemplary embodiment, the transmission 34 may provide three forward gear ratios and three reverse gear ratios, which generally provide six speed ranges, e.g., one speed range corresponding to each gear ratio. Alternatively, there may be more or less speed ranges than the number of gear ratios available in the transmission 34.

The drive train 30 may further include a control apparatus 40. The control apparatus 40 may include an actuator assembly 42 having a number of actuators 44. Each actuator 44 is operable to selectively engage or disengage one of the gear ratios of the transmission 34 with the transmission output shaft 39 in response to a control signal received via a respective signal line 48. The control apparatus 40 further includes a controller 46 which receives inputs and based on the inputs, generates shift signals which are directed to the actuators 44 via the signal lines 48. For example, to cause the upshift from the first gear ratio to the second gear ratio, the controller 46 generates an upshift signal which causes the actuator 44 associated with the first gear ratio to disengage the first gear ratio from the transmission output shaft 39 and causes the actuator 44 associated with the second gear ratio to engage the second gear ratio to the transmission output shaft. Similarly, to cause the downshift from the first gear ratio to the second gear ratio, the controller 46 generates a downshift signal which causes the actuator 44 associated with the second gear ratio to disengage the second gear ratio from the transmission output shaft 39 and causes the actuator 44 associated with the first ratio to engage the first gear ratio to the transmission output shaft 39.

The controller 46 may also receive various other input signals representative of the haulage vehicle system parameters, including, but not limited to, an engine speed signal from an engine speed sensor 50, a transmission input speed signal from a transmission input speed sensor 52, and a transmission output speed signal from a transmission output speed sensor 54. The sensors 50, 52, 54 may be conventional electrical transducers, such as, for example, a magnetic speed pickup type transducer.

The controller 46 may include a number of conventional devices including a microprocessor (not shown), a timer (not shown), input/output devices (not shown), and a memory device 56. Stored in the memory device 56 may be one or more operation characteristics relating to the operation of the haulage vehicle 20. For example, the operation characteristics may include haulage characteristics, i.e., characteristics associated with a particular haulage operation, e.g., along the assigned haul route 16. Haulage characteristics may include, but are not limited to, measured and/or target payload amount, vehicle weight, control parameters (e.g., gear selection along the haul route, vehicle speed along the haul route, etc.), haul route characteristics, etc. The haulage characteristics may be predetermined prior to the haulage operation and may be different at various points or segments 18 of the assigned haul route 16. The operation characteristics may be preprogrammed, e.g., at the factory, at the mine site 12, or at another location on or away from the assigned haul route 16. The operation characteristics may also be transmitted to the haulage vehicle 16 and stored in the memory device 56, as described below.

Figure 3:
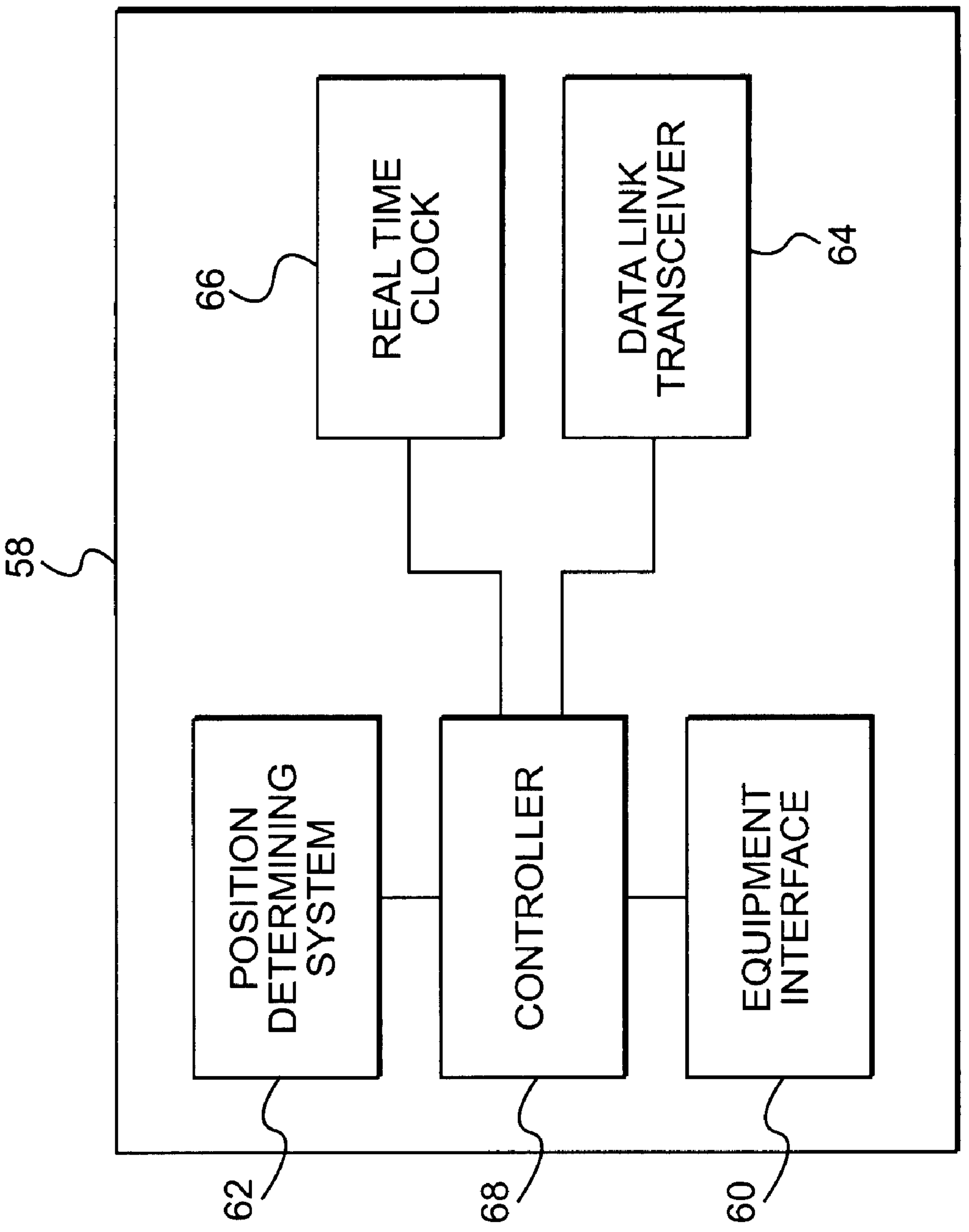
FIG. 3 is a schematic and diagrammatic illustration of an exemplary communicating device of a haulage vehicle.

The control apparatus 40 may also include a communicating device 58 configured to communicate information to and from the controller 46. FIG. 3 illustrates an embodiment of the communicating device 58. The communicating device 58 may be electronically connected, e.g., via an equipment interface 60, to other components of the haulage vehicle 20 in order to receive power from the components, and/or to transfer component/operation related information to and from the components, such as the controller 46. Alternatively, the communicating device 58 may include its own power source. The communicating device 58 may also include a position determining system 62, which may include a global positioning satellite (GPS) receiver and associated hardware and software, for receiving and determining machine location related information. Based on the location information, the communicating device 58 may determine the location of the haulage vehicle 20, portions of the haulage vehicle 20, or elements associated with the haulage operation. Alternatively, the position determining system 62 may be located elsewhere on the haulage vehicle 20, and the machine location information may be delivered to the communicating device 58.

The communicating device 58 may communicate information to and from a remote data facility, such as the central computer system 72 (FIG. 4), and may receive information and/or request information from the central computer system 72. The communicating device 58 may include a wireless data link transceiver 64 to communicate with the central computer system 72 and/or the communicating devices 58 of other haulage vehicles 20. In one embodiment, the data link is a wireless communication link, and the wireless communication link may include a satellite data link, cellular data link, radio frequency data link, or other form of wireless data link. In addition, the network may include a local data link (not shown) for access by service personnel. The communicating device 58 may also include a real time clock 66 from which the time of day and date may be determined.

The communicating device 58 may include a controller 68. The controller 68 may be configured to receive messages from the central computer system 72, position information from the positioning system 62, time information from the real time clock 66, equipment information from the equipment interface 60, and responsively monitor the position, time and/or operation of the haulage vehicle 20, and deliver the monitoring information to the central computer system 72. The controller 68 may also include memory for storing information when appropriate. The memory may include a database (not shown) having information associated with the haulage operation.

FIG. 4 illustrates an embodiment of a haulage vehicle monitoring system 70. The haulage vehicle monitoring system 70 may include a plurality of the communicating devices 58, each associated with one of the haulage vehicles 20. The communicating devices 58 may be configured to communicate with the central computer system 72, and/or each other through a communication network 74. The communication network 74 may include a wireless network, wired network, or a combination thereof. The wireless network may include a satellite network, a cellular network, a radio frequency network, and/or other forms of wireless communication. In addition, the communication network may include wired network such as a network with a modem with access to a public, or private, telephone line, a fiber optic or coaxial cable based network, a twisted pair telephone line network, or any other type of wired communication network.

The central computer system 72 may be a controller that is programmed and configured for receiving and processing information from each of the haulage vehicles 20 and also for transmitting information to each of the haulage vehicles 20. For example, the central computer system 72 may include a number of conventional devices including a microprocessor (not shown), a timer (not shown), input/output devices (not shown), a memory device (not shown), and a communicating device (not shown). The central computer system 72 may be located proximate the haulage operation or at a considerable distance remote from the haulage operation. The central computer system 72 may be located in a remote station, a monitoring facility, a central data facility, or other facility capable of exchanging information with at least one haulage vehicle communicating device 58. For example, the central computer system 72 may be located in a fixed or mobile office capable of communicating and processing equipment/process information, or capable of passing the information to another facility to perform this analysis. The central computer system 72 may be located within or close to the mine operation 10, or at a facility situated at a remote location. The central computer system 72 may be suitably programmed and configured to compare the information received from the fleet of haulage vehicles 20 with predetermined data. The predetermined data may be idealized data representative of a desired result.

Figure 5:
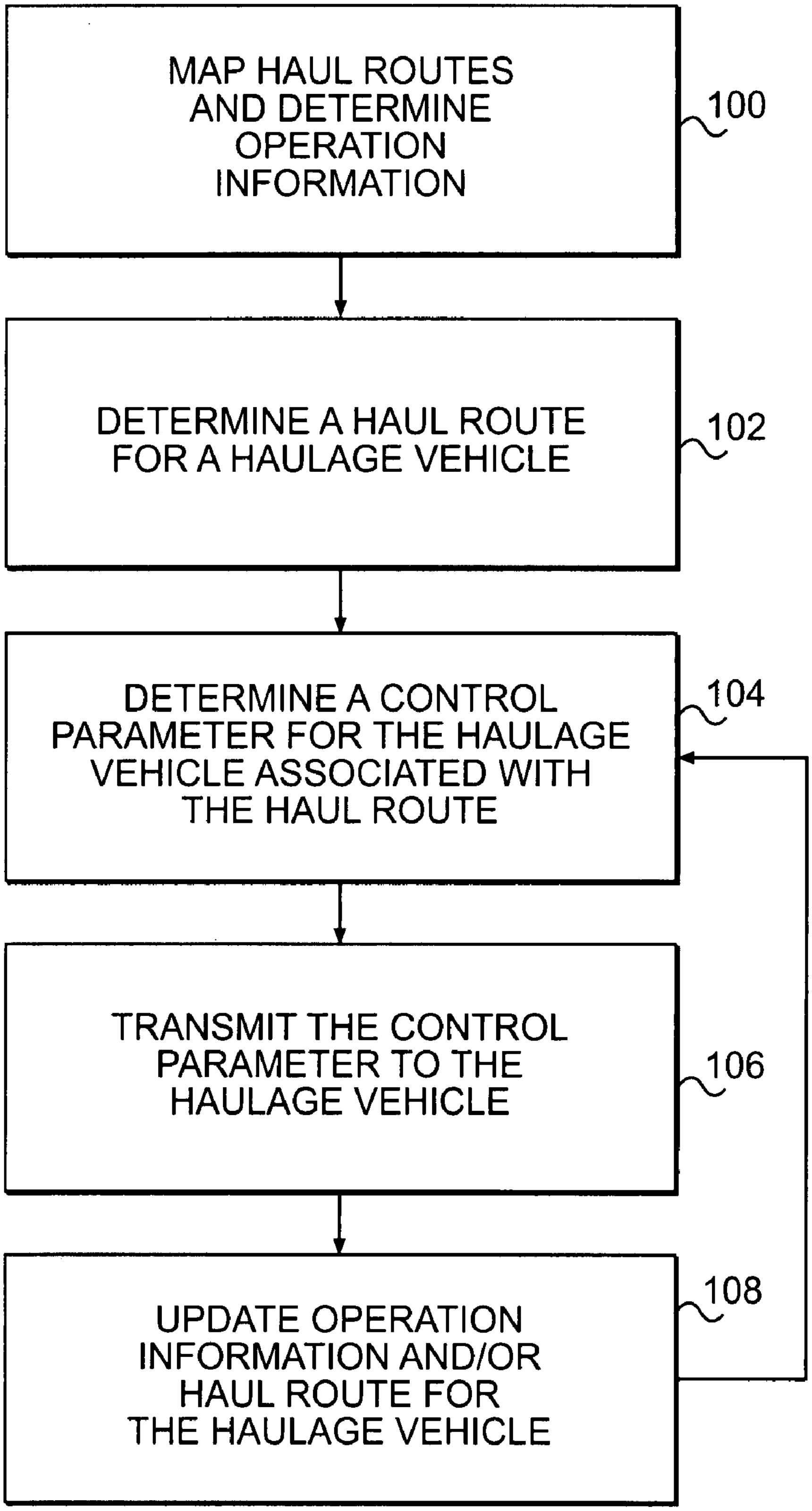
FIG. 5 is a flow chart illustrating an exemplary method of controlling the haulage vehicle.

FIG. 5 is a flow chart of an exemplary process for controlling the haulage vehicles 20 consistent with certain disclosed embodiments. In one embodiment, the process of FIG. 5 may be executed by the central computer system 72 one or more times during the lifetime of each haulage vehicle 20 (e.g., following an assembly of the haulage vehicle 20, before the haulage vehicle 20 has been delivered to the mine site 12, and/or after delivery of the haulage vehicle 20 to the mine site 12). Steps 100-108 may be executed once, after a predetermined event has occurred, or periodically at regular time intervals.

One or more surveying or monitoring entities (not shown) may be used to compile information relating to the haul routes 16 of the mine site 12. The information relating to the haul routes 16 may be used to map the haul routes 16 of the entire mine operation 10, or a portion of the mine operation 10 that includes the haul routes 16 used in the haulage operation of one or more of the haulage vehicles 20. The information relating to the haul routes 16 may be transmitted to the central computer system 72, and the central computer system 72 may generate one or more maps based on the transmitted information (step 100). Alternatively, or in addition, the surveying entity may generate the map based on the information relating to the haul routes 16 and may transmit the map to the central computer system 72, and/or the surveying entity may transfer the information relating to the haul routes 16 to a mapping entity (not shown) that may generate the map based on the transmitted information and transmit the map to the central computer system 72.

The map may indicate one or more operation characteristics, such as one or more haul route characteristics, i.e., characteristics associated with the haul routes 16. For example, the maps may show the location and profile of the haul routes 16 (e.g., x, y, and z coordinates determined using GPS data, curvature, length, elevation, etc.), and may reflect the existing condition of the haul routes 16 of the mine site 12 (e.g., road grade, moisture, total effective grade (e.g., road grade and rolling resistance due to tires, road resistance, and/or wind resistance), etc.). The map may also incorporate torque estimator data at one or more points along the drive train 30 that is determined, e.g., using a torque estimator system such as a system running software programmed with a torque estimating algorithm. The map may also include location information regarding entities such as obstacles and barriers. These obstacles may include existing structural entities, such as, for example, buildings, utilities infrastructure, fences, curbs, and any other structure to be avoided by the haulage vehicle 20. Possible barriers may include intangible entities, such as, for example, easements, building envelopes, property lines, or any other type of arbitrary boundary. Other possible entities may include projected locations of obstacles or barriers that have yet to be established. The map may also include information regarding safety-related speed limits and may determine speed limits or other control-related information based on weather and road conditions (e.g., fog, dust, icy road conditions, wet road conditions, etc.) along one or more segments 18 of the haul routes 16. These haul route characteristics may be sensed directly and/or derived from sensed data, e.g., by calculations performed with software. Equipment for gathering information relating to these haulage characteristics may include a GPS receiver or similar system.

Each of the maps may be in the form of one or more tables, graphs, and/or equations and may be based on a compilation of collected data. The surveying entities may include one or more personnel (e.g., surveyors) and/or one or more surveying machines that include a position monitoring system (e.g., a supervisory vehicle, mining truck, haulage vehicle 20, or other machine 22, etc.). A surveying machine with a position monitoring system may drive around the mine site 12 collecting information along the way. The surveying machine may record the haul route information and may transfer the recorded haul route information to the central computer system 72, which may in turn generate the map of each haul route 16 of the mine site 12 from the transmitted haul route information. Alternatively, surveyors may input the haul route information directly into the central computer system 72. As another alternative, the map may be downloaded or programmed from an outside source, such as the mapping entity. For example, when a haulage vehicle 20 is designated for use at a particular mine site 12, pre-established maps of that mine site 12 may be downloaded or programmed into the central computer system 72. Downloading or programming of information may be performed using external devices such as laptops, personal digital assistants (PDAs), etc. Information transfer to the central computer system 72 may also be performed wirelessly with a network connection to laptops, PDAs, etc., or to a central server at an offsite location.

One or more haulage vehicles 20 may be assigned to one or more specific haul routes 16, and the assignment may be recorded in the central computer system 72 (step 102). The assignment may be performed automatically by the central computer system 72 or input into the central computer system 72, e.g., by an operator. Each assignment may include information identifying the assigned haul route 16, e.g., a map, or identifying the location of sites to which the haulage vehicle 20 travels.

The central computer system 72 may determine one or more control parameters for each haulage vehicle 20 associated with its assigned haul route 16 (step 104). The control parameters may relate to a specified operation of the haulage vehicle 20 over one or more segments 18 of the haul route 16. For example, the control parameters may include, but are not limited to, a shift strategy including one or more shift points or a gear selection pattern (or shift pattern), characteristics relating to the management of parasitic loads such as accessories, characteristics relating to the management of fuel injection in the engine 32, engine or hydraulic motor speed, torque output commands, pedal displacement commands, a maximum and/or minimum of one or more of these commands, etc., for the haulage vehicle 20 over one or more segments 18 of the haul route 16.

The control parameter may be determined based on one or more operation characteristics relating to the operation of the haulage vehicle 20, such as a weight of the haulage vehicle 20, a haulage characteristic associated with the haulage operation assigned to the haulage vehicle 20, etc. For example, the haulage characteristic may be the measured payload amount, a haul route characteristic associated with the assigned haul route 16 (e.g., location, curvature, length, elevation, road grade, total effective grade, moisture, torque estimate, etc.), etc. The haul route characteristics may be one or more of the haul route characteristics determined by the surveying entities and stored in the central computer system 72, as described above.

The control parameter may be determined using an optimization algorithm stored in the central computer system 72. The optimization algorithm may be used to optimize the determined control parameter based on one or more guidelines, such as minimizing a number of shifts, maximizing haulage vehicle speed, minimizing haulage cycle time, minimizing fuel consumption, minimizing component wear, minimizing cost per unit weight of payload, maintaining an economically efficient balance between one or more of these guidelines, etc. Control parameters may be determined using the optimization algorithm to provide desired haulage vehicle performance. These control parameters may be interchangeably characterized as optimum, target, or desired and are intended to embrace the particular parameters that, taken together, result in optimum, target, or desired productivity and efficiency in the haulage operation. Derivation of control parameters may be accomplished, for example, by use of simulation software, or by calculations that may be based on data gathered over a period of time. The central computer system 72 may also include an operator interface (not shown) to allow the operator to override one or more of the control parameters determined by the central computer system 72.

Next, the central computer system 72 may transmit the control parameters to the respective haulage vehicles 20 (step 106). The central computer system 72 may also transfer the haul route assignments to the corresponding haulage vehicles 20. The haul route assignment and control parameter may be stored in the respective memory device 56 of the haulage vehicle 20. Then, the haulage vehicles 20 may be activated to perform their respective haulage operations along their assigned haul routes 16 and in accordance with the respective control parameters. The control parameters may override any control commands determined locally by the haulage vehicle 16, such as shift points, control of parasitic loads such as accessories, control of fuel injection in the engine 32, engine or hydraulic motor speed, torque output commands, pedal displacement commands, etc. In addition, the operator may be provided with an input device to allow the operator to cancel operation of the haulage vehicle 20 in accordance with the control parameter.

The central computer system 72 may update one or more of the operation characteristics and/or the assigned haul route 16 for one or more of the haulage vehicles 20 (step 108). The update may occur periodically (e.g., weekly, daily, hourly, etc.), after a predetermined haulage operation or shift is complete, or after another predetermined event has a occurred. For example, one of the operation characteristics for a particular haulage vehicle 20, such as a haulage characteristic, e.g., a target and/or measured payload amount or haul route characteristic (e.g., location, curvature, length, elevation, road grade, total effective grade, moisture, torque estimate, etc.), may be updated. Alternatively, or in addition, the haul route 16 assigned to a particular haulage vehicle 20 may be updated. In another alternative, or in addition, the optimization algorithm may be modified, e.g., to determine the control parameter based on different guidelines, and the control parameters may be updated based on the modified optimization algorithm. Control then proceeds back to step 104. Then, the central computer system 72 may determine one or more control parameters for each haulage vehicle 20 associated with an updated assigned haul route 16 and/or updated operation characteristic (step 104), and may transmit the new control parameters to the respective haulage vehicles 20 (step 106).

Alternatively, the haulage vehicle 20 may determine the control parameters. The central computer system 72 may store operation characteristics and assigned haul route 16, and may transmit the stored operation characteristics (or a subset thereof) and assigned haul route 16 to the haulage vehicle 20. The haulage vehicle 20 may store the received operation characteristics and assigned haul route 16 in the memory device 56. Then, the haulage vehicle 20 may determine one or more control parameters for the haulage vehicle 20 based on the received operation characteristics and/or other operation characteristics stored in the haulage vehicle 20 (e.g., measured payload amount, vehicle weight, etc.). Then, the haulage vehicle 20 may be activated to perform its haulage operations along its assigned haul route 16 in accordance with the determined control parameters. Periodically, or after a predetermined event, the operation characteristics stored in the haulage vehicle 20 may be updated by receiving updated operation characteristics from the central computer system 72.

Figure 6:
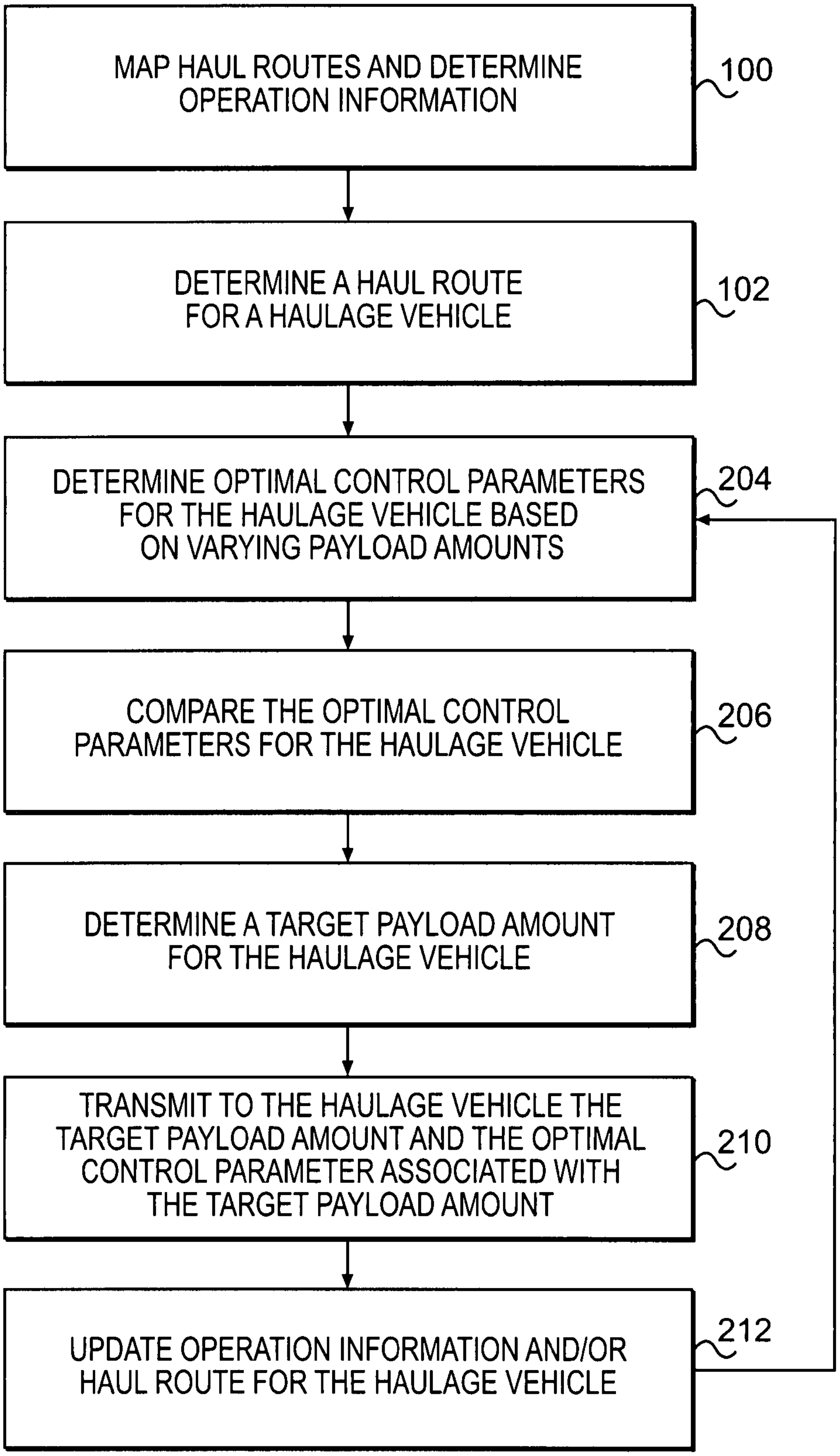
FIG. 6 is a flow chart illustrating another exemplary method of controlling the haulage vehicle.

Alternatively, as shown in FIG. 6, after mapping the haul routes 16 of the mine site 12 (step 100) and assigning the haulage vehicles 16 to one or more specific haul routes 16 (step 102), the central computer system 72 may determine optimal control parameters based on varying payload amounts for each haulage vehicle 20 (step 204). The varying payload amounts may be specified by operator input or determined automatically by the central computer system 72.

Next, the central computer system 72 may compare the optimal control parameters for the respective haulage vehicle 20 (step 206) and may then determine a target payload amount for the respective haulage vehicle 20 based on the comparison (step 208). The optimal control parameters for the varying payload amounts may be compared using another optimization algorithm that selects the optimal control parameter (which may be used to determine the target payload amount) and/or target payload amount based on one or more guidelines, such as minimizing a number of shifts, maximizing haulage vehicle speed, minimizing haulage cycle time, minimizing fuel consumption, etc.

The central computer system 72 may then transmit to the respective haulage vehicle 20 the target payload amount and the optimal control parameter associated with the target payload amount (step 210). As described above in connection with step 108, the central computer system 72 may also transfer the haul route assignments to the corresponding haulage vehicles 20. The haul route assignment and control parameter may be stored in the respective memory device 56 of each haulage vehicle 20. Then, the haulage vehicles 20 may be activated to perform their respective haulage operations along their assigned haul routes 16 and in accordance with the respective optimal control parameters and target payload amounts.

Alternatively, after the central computer system 72 determines the multiple optimal shift strategies for the multiple different payload amounts (step 204), the central computer system 72 may store the information and use the stored information to determine the optimal shift strategy for the haulage vehicle 20 based on the measured payload amount. The central computer system 72 determines the measured payload amount (e.g., via the haulage vehicle 20 or other machine 22). Then, the central computer system 72 selects which of the multiple stored payload amounts is closest to the measured payload amount and determines which one of the multiple optimal shift strategies corresponds to that payload amount. Then, the central computer system 72 transmits the optimal shift strategy and haul route assignment to the haulage vehicle 20.

The central computer system 72 may update one or more of the operation characteristics and/or the assigned haul route 16 for one or more of the haulage vehicles 20 (step 212), as described above in connection with step 108. Control then proceeds back to step 204. Then, the central computer system 72 may determine optimal control parameters for each haulage vehicle 20 based on varying payload amounts based on the updated assigned haul route 16 and/or updated operation characteristic (step 204), may compare the optimal control parameters for the respective haulage vehicle 20 (step 206), may determine a target payload amount for the respective haulage vehicle 20 (step 208), and may transmit the new optimal control parameters and target payload amounts to the respective haulage vehicles 20 (step 210).

Figure 7:
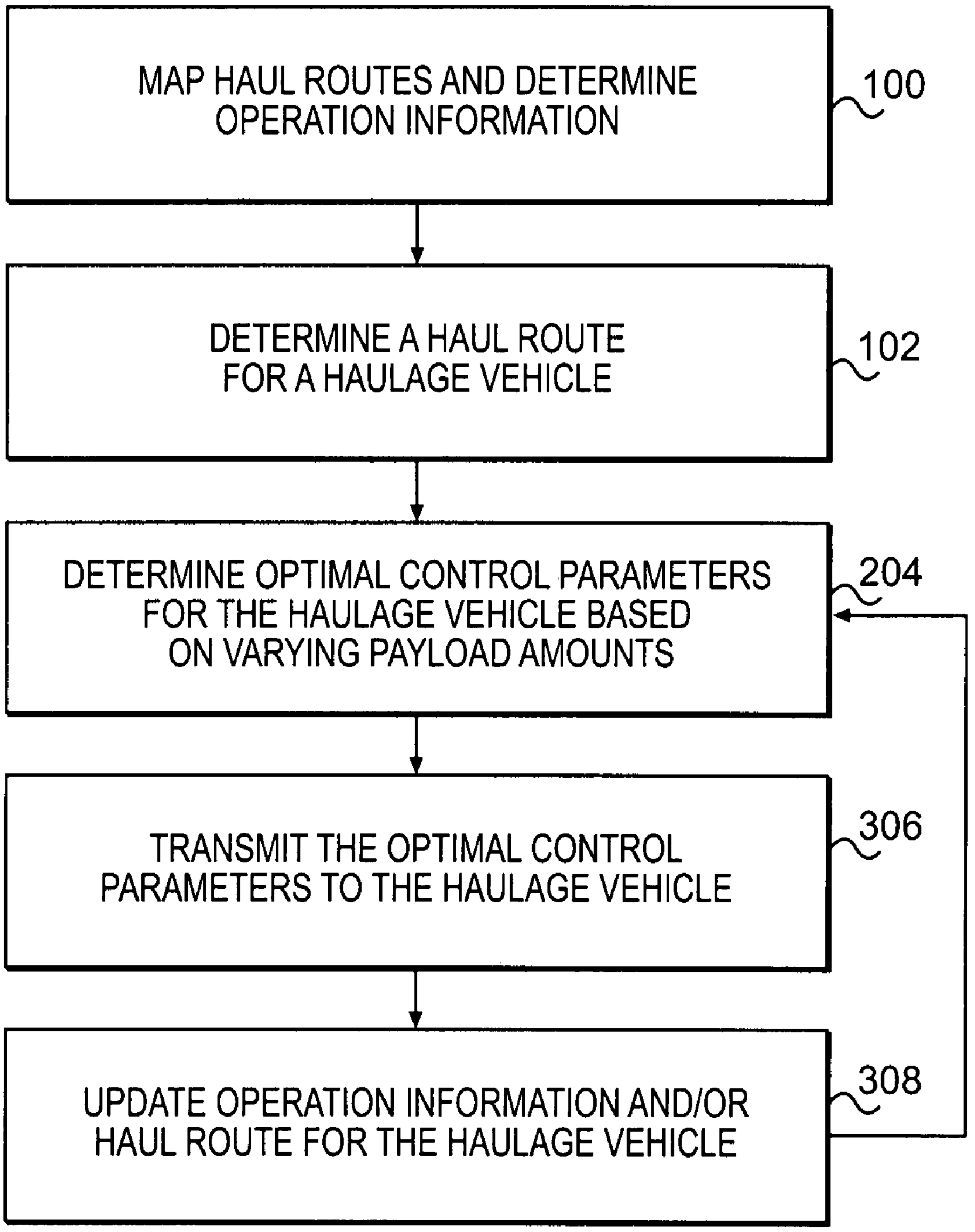
FIG. 7 is a flow chart illustrating a further exemplary method of controlling the haulage vehicle.

In another alternative, as shown in FIG. 7, after mapping the haul routes 16 of the mine site 12 (step 100), assigning the haulage vehicles 16 to one or more specific haul routes 16 (step 102), and determining optimal control parameters for each haulage vehicle 20 based on varying payload amounts (step 204), the central computer system 72 may transmit the optimal control parameters to the respective haulage vehicles 20 (step 306). The optimal control parameters for the varying payload amounts may be transmitted in the form of an optimization table, graph, equation, mapping, or other form. The central computer system 72 may also transfer the haul route assignments to the corresponding haulage vehicles 20. The haul route assignment and optimization table may be stored in the respective memory device 56 of each haulage vehicle 20.

Then, the haulage vehicles 20 may be activated to perform their respective haulage operations along their assigned haul routes 16. After the haulage vehicle 20 receives the payload, the payload amount may be measured (e.g., by the haulage vehicle 20 or by the machine 22 or other entity and communicated to the haulage vehicle 20). The measured payload amount may vary for different haulage cycles. The optimal control parameter for one or more haulage cycles (or portion thereof) may be determined based on the measured payload amount using the optimization table stored in the memory device 56 of the haulage vehicle 20. For example, the optimal control parameter may be selected by being the control parameter that corresponds to the payload amount in the optimization table that is closest to the measured payload amount. Thus, whenever the measured payload amount changes for a new haulage cycle, the haulage vehicle 20 can determine a new optimal control parameter based on the measured payload amount without having to communicate the new measured payload amount to the central computer system 72.

The central computer system 72 may update one or more of the operation characteristics and/or the assigned haul route 16 for one or more of the haulage vehicles 20 (step 308), as described above. Control then proceeds back to step 204. Then, the central computer system 72 may determine optimal control parameters for each haulage vehicle 20 based on varying payload amounts for the updated assigned haul route 16 and/or updated operation characteristic (step 204), and may transmit the new optimal control parameters to the respective haulage vehicles 20 (step 306).

Figure 8:
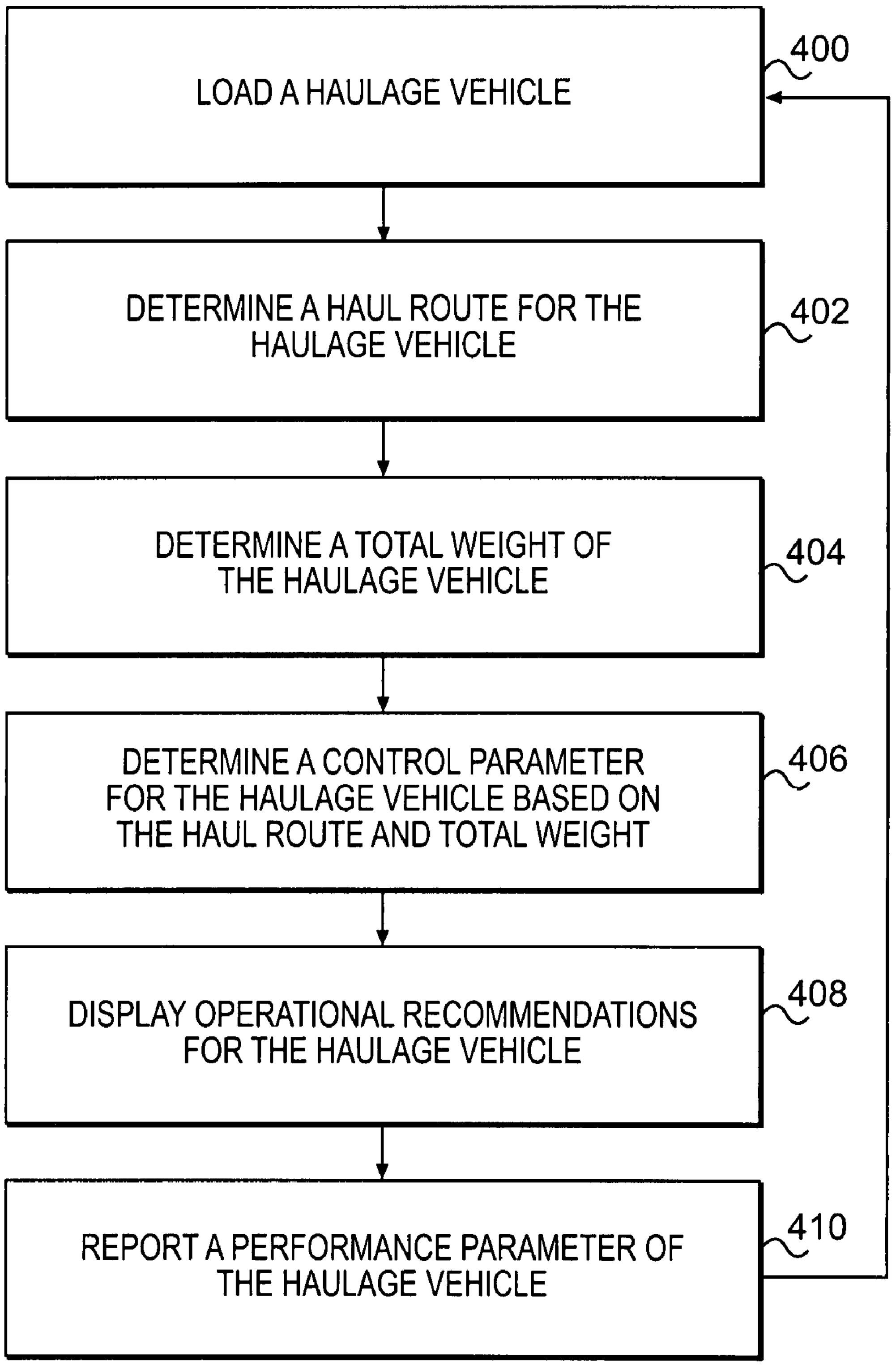
FIG. 8 is a flow chart illustrating yet another exemplary method of controlling the haulage vehicle.

FIG. 8 is a flow chart of an exemplary process for controlling the haulage vehicles 20 consistent with certain disclosed embodiments. The process of FIG. 8 may be executed by the haulage vehicle 20 one or more times during the lifetime of the haulage vehicle 20. Steps 400410 may be executed once, after a predetermined event has occurred, or periodically at regular time intervals.

The haulage vehicle 20 may be positioned in a loading position for a loading machine, such as the machine 22. Then, the payload may be loaded onto the haulage vehicle 20 (step 400). The haulage vehicle 20 may be assigned to one or more specific haul routes 16, and the haulage vehicle 20 may receive the haul route assignment information from the central computer system 72, an operator keypad on the haulage vehicle 20 or connected thereto, or based on the GPS determined location of the loading position of the haulage vehicle 20 (step 402).

The haulage vehicle 20 may also determine the total vehicle weight (step 404). The total vehicle weight may include the measured payload amount and stored vehicle weight (the weight of the unloaded haulage vehicle 20), which are transmitted from the load measuring system of the haulage vehicle 20, the load measuring system of the loading machine 22, and/or the central computer system 72. The haulage vehicle 20 may store in the memory device 56 operation characteristics transmitted from the central computer system 72, the assigned haul route 16, and the total vehicle weight. Then, the haulage vehicle 20 may determine one or more control parameters for the haulage vehicle 20 based on the received operation characteristics and/or other operation characteristics stored in the haulage vehicle 20 (e.g., measured payload amount, total vehicle weight, etc.) (step 406). In one aspect, the haulage vehicle 20 may determine one or more control parameters for one or more segments 18 of the haul route 16.

The haulage vehicle 20 may be activated to perform its haulage operation along its assigned haul route 16 in accordance with the determined control parameters. A monitor or other output device of the haulage vehicle 20 may display one or more operational recommendations to the haulage vehicle operator based on the location of the haulage vehicle 20 along the haul route 16 (step 408). For example, the haulage vehicle 20 may display different operation recommendations when the haulage vehicle 20 is operating on different segments 18 of the haul route 16. Periodically, or after a predetermined event, the operation characteristics stored in the haulage vehicle 20 may be updated by receiving updated operation characteristics from the central computer system 72.

The haulage vehicle 20 may report one or more vehicle performance parameters to the central computer system 72 (step 410). The vehicle performance parameters may indicate one or more haulage characteristics of the haulage vehicle 20. After unloading the payload from the haulage vehicle 20, control may return to step 400.

INDUSTRIAL APPLICABILITY

The disclosed method of controlling a vehicle may be applicable to any moving machine. The disclosed method of controlling a vehicle may increase the efficiency of the vehicle operation. Exemplary embodiments of the method of controlling the haulage vehicle 20 will now be described.

In one exemplary embodiment, a surveying entity compiles haul route information, such as location, length, road grade, total effective grade, and moisture of the haul routes 16, and transmits the haul route information to the central computer system 72. The central computer system 72 then creates a map of the haul routes 16 of the mine operation 10. The central computer system 72 assigns the haulage vehicle 20 to a specific haul route 16 (step 102) and determines a shift strategy for the haulage vehicle 20 based on the haul route information of the haul route 16 assigned to the haulage vehicle 20 (step 104). For example, the central computer system 72 may select a certain gear or range of gears for the haulage vehicle 20 for each segment 18 of the haul route 16 based on the vehicle weight, measured payload amount, road grade, total effective grade, moisture, and other conditions of the respective segments of the haul route 16. The shift strategy may be determined based on an optimization algorithm. The shift strategy for the haulage vehicle 20 may be transmitted from the central computer system 72 to the haulage vehicle 20 (step 106). At the same time, the haul route assignment may also be transmitted from the central computer system 72 to the haulage vehicle 20. Then, an operator of the haulage vehicle 20 may operate the haulage vehicle 20 along the assigned haul route 16. The haulage vehicle 20 follows the shift strategy determined by the central computer system 72, and the shift strategy may override any autoshifting by the haulage vehicle 20 or other shift commands that differ from the shift strategy. For example, if the segment 18 of the haul route 16 is relatively bumpy, the shift strategy may specify that when the haulage vehicle 20 is traveling over that particular segment 18 of the haul route 16, the transmission 34 remains at a certain gear instead of allowing the transmission 34 to autoshift back and forth between two gears. As a result, the efficiency of the transmission 34 may be increased, the cycle times may decrease, and fuel consumption may decrease by minimizing the number of inefficient shifts.

In another exemplary embodiment, the central computer system 72 may determine a speed or range of speeds for the haulage vehicle 20 for each segment 18 of the haul route 16 based on the vehicle weight, measured payload amount, and road grade and other conditions of the respective segments of the haul route 16 (step 104). The specified speeds for the haulage vehicle 20 and the haul route assignment may be transmitted from the central computer system 72 to the haulage vehicle 20 (step 106). Then, an operator of the haulage vehicle 20 may operate the haulage vehicle 20 along the assigned haul route 16. The haulage vehicle 20 travels in accordance with the speeds determined by the central computer system 72 in step 104, and the speeds specified by the central computer system 72 may override any auto retarder control by the haulage vehicle 20 or other automatic speed commands that differ from the specified speeds. The haulage vehicle 20 may allow the operator to override the speed control, if necessary.

In a further exemplary embodiment, the central computer system 72 may determine a strategy for managing parasitic loads of the haulage vehicle 20 based on the haul route information of the haul route 16 assigned to the haulage vehicle 20 (step 104). The parasitic loads may include loads from one or more accessories, such as an electrical-based system (e.g., alternator), a cooling system (e.g., cooling fan, engine fan, heater, etc.), a power take-off system (e.g., accessory drive shafts), and any other type of accessory component that may automatically draw parasitic power from the engine 32. The strategy for managing the parasitic loads for the haulage vehicle 20 may be determined based on an optimization algorithm and may be transmitted from the central computer system 72 to the haulage vehicle 20 (step 106). At the same time, the haul route assignment may also be transmitted from the central computer system 72 to the haulage vehicle 20. Then, the operator of the haulage vehicle 20 may operate the haulage vehicle 20 along the assigned haul route 16. The haulage vehicle 20 follows the parasitic load management strategy determined by the central computer system 72, and the strategy may override any commands for controlling the operation of the parasitic loads that differ from the strategy. For example, if a certain segment 18 of the haul route 16 requires more power from the engine 32, the parasitic load management strategy may specify that when the haulage vehicle 20 is traveling over that particular segment 18 of the haul route 16, certain accessory loads are shut off or receive less power in order to increase the amount of power to the drive train 30. For haulage vehicles 20 with geared transmissions, the parasitic load management strategy may allow the haulage vehicle 20 to operate in a "power burst mode" over the segments 18 of the haul route 16 for which it is difficult for the haulage vehicle 20 to maintain the gear.

In another exemplary embodiment, after mapping the haul routes 16 of the mine site 12 (step 100) and assigning the haul route 16 to the haulage vehicle 16 (step 102), the central computer system 72 determines optimal shift strategies for the haulage vehicle 20 based on varying payload amounts (step 204). For example, the central computer system 72 may determine five optimal shift strategies for the haulage vehicle 20 based on five different payload amounts such that there is an optimal shift strategy for each payload amount. Alternatively, the central computer system 72 may determine a different number of optimal shift strategies based the corresponding number of payload amounts. The optimal shift strategies may be determined using an optimization algorithm. The central computer system 72 compares the five optimal shift strategies determined for the five different payload amounts (step 206) and determines a target payload amount for the haulage vehicle 20 based on the comparison (step 208). The target payload amount for the haulage vehicle 20 may be determined based on another optimization algorithm. The target payload amount for the haulage vehicle 20 and the corresponding optimal shift strategy may be transmitted from the central computer system 72 to the haulage vehicle 20 (step 210). At the same time, the haul route assignment may also be transmitted from the central computer system 72 to the haulage vehicle 20. Then, the operator of the haulage vehicle 20 may operate the haulage vehicle 20 along the assigned haul route 16. The haulage vehicle 20 follows the optimal shift strategy determined by the central computer system 72, and the optimal shift strategy may override any autoshifting by the haulage vehicle 20 or other shift commands that differ from the shift strategy. The operator of the haulage vehicle 20 may use the target payload amount determined by the central computer system 72 when loading the payload onto the haulage vehicle 20. Thus, both the shift strategy (i.e., the control parameter) and the payload amount may be optimized, thereby allowing for greater efficiency of the haulage operation. Power may be more efficiently transferred from the truck to the ground, thereby allowing a reduction in cycle time and fuel consumption.

Alternatively, after the central computer system 72 determines the five optimal shift strategies for the five different payload amounts (step 204), the central computer system 72 may store the information and use the stored information to determine the optimal shift strategy for the haulage vehicle 20 based on the measured payload amount. For example, the central computer system 72 determines the measured payload amount (e.g., via the haulage vehicle 20 or other machine 22). Then, the central computer system 72 selects which of the five stored payload amounts is closest to the measured payload amount and determines which one of the five optimal shift strategies corresponds to that payload amount. Then, the central computer system 72 transmits the optimal shift strategy and haul route assignment to the haulage vehicle 20. Since some loading machines 22 cannot consistently load the haulage vehicle 20 with the same payload amount, this method allows the central computer system 72 to determine an optimal shift strategy based on the actual or measured payload amount. The central computer system 72 stores a set of optimal shift strategies and determines the optimal shift strategy corresponding to the payload amount that is closest to the actual payload amount. A new optimal shift strategy does not have to be determined whenever the measured payload amount changes. The optimal shift strategy may be determined from the stored set of optimal shift strategies. Furthermore, greater efficiency may be achieved by determining the optimal shift strategy based on the payload amount that is closest to the actual payload amount.

In a further exemplary embodiment, the central computer system 72 may determine five optimal shift strategies for the haulage vehicle 20 based on five different payload amounts such that there is an optimal shift strategy for each payload amount (step 206) and may transmit to the haulage vehicle 20 the five optimal shift strategies corresponding to the five payload amounts in the form of an optimization table (step 306). At the same time, the haul route assignment may also be transmitted from the central computer system 72 to the haulage vehicle 20. Each time the haulage vehicle 20 receives a payload, the payload amount may be measured and input into the optimization table, which may be stored in the memory device 56 of the haulage vehicle 20, to determine the optimal shift strategy. Then, the operator may operate the haulage vehicle 20 along the assigned haul route 16. The haulage vehicle 20 follows the optimal shift strategy, which may override any autoshifting by the haulage vehicle 20 or other shift commands that differ from the optimal shift strategy. Thus, the shift strategy (i.e., the control parameter) used by the haulage vehicle 20 may be optimized based on the actual payload amount, thereby allowing for greater flexibility and efficiency of the haulage operation.

In yet another exemplary embodiment, after the haulage vehicle 20 has been operated along the assigned haul route 16, the haul route information may be updated and/or a new haul route 16 may be assigned to the haulage vehicle 20. This information may be updated in the central computer system 72 (step 108, 212, 308). Then, the central computer system 72 may use the updated information to determine a new shift strategy for the haulage vehicle 20 and may transmit the new shift strategy to the haulage vehicle 20. Alternatively, the central computer system 72 may use the updated information to determine a number of optimal shift strategies based on the corresponding number of varying payload amounts, may compare the optimal shift strategies, may determine the target payload amount based on the comparison, and may transmit to the haulage vehicle 20 the target payload amount and the optimal shift strategy corresponding to the determined target payload amount. As another alternative, the central computer system 72 may use the updated information to determine a number of optimal shift strategies based on the corresponding number of varying payload amounts, may create an optimization table based on the optimal shift strategies, and may transmit the optimization table to the haulage vehicle 20. As a result, the operation characteristics used to determine the shift strategy (i.e., the control parameter) used by the haulage vehicle 20 may be kept up-to-date using updated operation characteristics, e.g., updated haul route characteristics.

It will be apparent to those skilled in the art that various modifications and variations can be made to the method of controlling a vehicle. Other embodiments will be apparent to those skilled in the art from consideration of the specification and practice of the disclosed method of controlling a vehicle. It is intended that the specification and examples be considered as exemplary only, with a true scope being indicated by the following claims and their equivalents.

What is claimed is:

1. A method of controlling a vehicle, comprising:

determining an operation assigned to the vehicle along at least one segment of a route assigned to the vehicle;

determining at least one control parameter of the vehicle based on at least one operation characteristic, the at least one operation characteristic relating to the operation assigned to the vehicle and wherein the at least one operation characteristic includes at least one route characteristic of the assigned route, the at least one route characteristic relating to at least one of location, road grade, total effective grade, and moisture of the assigned route, the at least one control parameter being determined before operating the vehicle on the assigned route;

storing the at least one route characteristic in memory of an off-board computer system, the at least one control parameter being determined using the off-board computer system;

transmitting the at least one control parameter to the vehicle; and operating the vehicle to execute the operation assigned to the vehicle, including implementing the at least one control parameter.

2. The method of claim 1, wherein operating the vehicle to execute the operation assigned to the vehicle, including implementing the at least one control parameter includes overriding a local control command.

3. The method of claim 1, wherein the at least one operation characteristic further includes a measured payload amount.

4. The method of claim 1, wherein the at least one control parameter includes at least one of a shift strategy, an engine speed, a hydraulic motor speed, a strategy for managing parasitic loads, or a strategy for managing fuel injection in an engine of the vehicle.

5. The method of claim 4, wherein the at least one control parameter includes a shift strategy, and the method further includes:

determining a shift strategy for each of a plurality of different payload amounts; and determining an applied shift strategy based on the determined shift strategies and a measured payload amount.

6. The method of claim 1, wherein the at least one control parameter is determined using an optimization algorithm, the optimization algorithm determining the at least one control parameter based on at least one of a target number of shifts, a target vehicle speed, a target cycle time, or a target amount of fuel consumed.

7. The method of claim 1, further including:

updating the operation characteristic; and updating the at least one control parameter of the vehicle based on the updated operation characteristic.

8. A system for controlling a vehicle, comprising:

a controller and memory coupled to the controller, the controller configured to:

determine an operation assigned to the vehicle along at least one segment of a route assigned to the vehicle, determine at least one control parameter of the vehicle based on at least one operation characteristic before the vehicle operates on the assigned route, the at least one operation characteristic relating to the operation assigned to the vehicle, the determination of the at least one control parameter including determining a reduction in power consumption by one or more parasitic loads during at least one portion of the assigned operation to free up power for other loads; and implement the determined reduction in power consumption by the one or more parasitic loads during operation of the vehicle to free up power for other loads.

9. The system of claim 8, wherein the at least one operation characteristic includes at least one route characteristic of the assigned route, the at least one route characteristic relating to at least one of location, road grade, total effective grade, and moisture of the assigned route.

10. The system of claim 8, wherein the controller and memory are disposed in an off-board computer system.

11. The system of claim 8, wherein:

the at least one control parameter includes a shift strategy; and the controller is further configured to determine a shift strategy for each of a plurality of different payload amounts.

12. The system of claim 11, wherein the controller is disposed in an off-board computer system, and the controller is further configured to:

determine a target shift strategy based on the determined shift strategies, and transmit the target shift strategy to the vehicle.

13. The system of claim 11, wherein:

the controller is disposed in an off-board computer system, and the controller of the off-board computer system is configured to transmit the determined shift strategies and associated payload amounts to the vehicle; and a controller in the vehicle is configured to determine a target shift strategy based on the determined shift strategies.

14. The system of claim 13, wherein the controller in the vehicle is configured to determine the target shift strategy based on the determined shift strategies and a measured payload amount.

15. The method of claim 8, wherein implementing the determined reduction in power consumption by the one or more parasitic loads during operation of the vehicle to free up power for other loads includes freeing up power for propulsion of the vehicle.

16. The method of claim 8, wherein the vehicle is at least one of a truck, a crane, an earth moving machine, a mining vehicle, material handling equipment, and a loader.

17. A method of controlling a vehicle, comprising:

determining at least one control parameter of the vehicle associated with each of a plurality of payload amounts, the at least one control parameter being associated with an operation of the vehicle along at least one segment of a route of the vehicle;

selecting a desired payload amount for the operation of the vehicle along the at least one segment of the route of the vehicle, including selecting the desired payload amount based on at least one operation characteristic relating to the route of the vehicle;

determining a target control parameter based at least in part on the at least one determined control parameter and the desired payload amount; and implementing the target control parameter during operation of the vehicle.

18. The method of claim 17, wherein the determination of the at least one control parameter associated with each of the plurality of payload amounts occurs before operating the vehicle along the route.

19. The method of claim 17, wherein:

the at least one control parameter associated with each of the plurality of payload amounts includes a shift strategy;

the shift strategy is determined for each of the payload amounts; and the method further includes determining a target shift strategy.

20. The method of claim 17, further including:

measuring an actual payload amount; and wherein determining a target control parameter based at least in part on the determined control parameters and the desired payload amount includes determining the target control parameter based on the determined control parameters, the desired payload amount, and the measured payload amount.

21. The method of claim 17, wherein selecting the desired payload amount based on at least one operation characteristic relating to the route of the vehicle includes selecting the desired payload amount based on at least one of location, road grade, total effective grade, and moisture of the route of the vehicle.

* * * * *